(12) United States Patent
Nagase

(10) Patent No.: US 9,632,962 B2
(45) Date of Patent: Apr. 25, 2017

(54) INFORMATION PROCESSING APPARATUS AND METHOD FOR GENERATING COUPLING INFORMATION

(71) Applicant: FUJITSU LIMITED, Kawasaki-shi, Kanagawa (JP)

(72) Inventor: Atsushi Nagase, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 462 days.

(21) Appl. No.: 14/161,019

(22) Filed: Jan. 22, 2014

(65) Prior Publication Data
US 2014/0281103 A1  Sep. 18, 2014

(30) Foreign Application Priority Data
Mar. 18, 2013 (JP) ................ 2013-054641

(51) Int. Cl.
*G06F 13/24* (2006.01)
*G06F 13/40* (2006.01)
*H04L 12/40* (2006.01)

(52) U.S. Cl.
CPC .... *G06F 13/4004* (2013.01); *H04L 12/40078* (2013.01)

(58) Field of Classification Search
None
See application file for complete search history.

(56) References Cited

U.S. PATENT DOCUMENTS

| 6,633,943 | B1 | 10/2003 | James et al. |
| 6,870,818 | B1 | 3/2005 | Burdin et al. |
| 8,554,890 | B2 | 10/2013 | Tameshige et al. |
| 2001/0048668 | A1 | 12/2001 | Sakai |
| 2005/0047352 | A1 | 3/2005 | Burdin et al. |
| 2005/0182853 | A1* | 8/2005 | Lewites ............... H04L 49/70 709/238 |
| 2006/0209848 | A1 | 9/2006 | Burklin et al. |

(Continued)

FOREIGN PATENT DOCUMENTS

| JP | 2007-316724 A | 12/2007 |
| JP | 2010-124129 A | 6/2010 |
| JP | 2011-203810 | 10/2011 |

OTHER PUBLICATIONS

Extended Search Report issued Mar. 28, 2014 in European Patent Application No. 14151260.8.

*Primary Examiner* — Elias Mamo
(74) *Attorney, Agent, or Firm* — Oblon, McClelland, Maier & Neustadt, L.L.P.

(57) ABSTRACT

A processing apparatus includes a memory, and a processor coupled to the memory and configured to acquire first data that indicates correspondence relationship between a first address given to a first adapter of a first device and a first bus number given to a first bus coupled to the first adapter, acquire second data that indicates correspondence relationship between a second address given to a second adapter of a first device and a second bus number given to a second bus coupled to the second adapter, acquire third data that indicates correspondence relationship between the first address and a port number given to a port of a second device, the port being coupled to the first adapter with the first bus, and when the second bus number is identical to the first bus number, generate fourth data that indicates that the second adapter is coupled to the port.

8 Claims, 24 Drawing Sheets

(56) References Cited

U.S. PATENT DOCUMENTS

| | | | | |
|---|---|---|---|---|
| 2007/0140263 A1* | 6/2007 | Mitome | ............. | H04L 12/4645 |
| | | | | 370/395.53 |
| 2009/0077552 A1* | 3/2009 | Sekiguchi | ........... | G06F 9/45558 |
| | | | | 718/1 |
| 2009/0083445 A1* | 3/2009 | Ganga | .................... | G06F 15/16 |
| | | | | 709/250 |
| 2009/0109970 A1* | 4/2009 | Ozawa | ................ | H04L 41/0853 |
| | | | | 370/389 |
| 2011/0153718 A1* | 6/2011 | Dham | ................ | H04L 12/2834 |
| | | | | 709/203 |
| 2012/0278807 A1* | 11/2012 | Nakagawa | ............ | G06F 9/4856 |
| | | | | 718/1 |

* cited by examiner

FIG. 8

| NETWORK ADAPTER ID | MAC ADDRESS | LOCATION INFORMATION | HYPERVISOR ID |
|---|---|---|---|
| na1 | A | 02:00.0 | hv1 |
| na2 | B | 02:00.1 | hv1 |
| na3 | C | 02:00.2 | hv1 |
| na4 | D | 02:00.3 | hv1 |
| na5 | E | 04:00.0 | hv1 |
| na6 | F | 06:00.0 | hv1 |

FIG. 9

| SWITCH ID | PORT NUMBER | COUPLING DESTINATION MAC ADDRESS |
|---|---|---|
| sw1 | 1 | |
| ⋮ | ⋮ | ⋮ |
| sw1 | n | A |
| sw2 | 1 | |
| ⋮ | ⋮ | ⋮ |
| sw2 | m | E |
| sw3 | 1 | |
| ⋮ | ⋮ | ⋮ |
| sw3 | p | F |

FIG. 11

| SWITCH ID | PORT NUMBER | HYPERVISOR ID | MAC ADDRESS OF NETWORK ADAPTER |
|---|---|---|---|
| sw1 | n | hv1 | A |

FIG. 12

| SWITCH ID | PORT NUMBER | HYPERVISOR ID | MAC ADDRESS OF NETWORK ADAPTER |
|---|---|---|---|
| sw1 | n | hv1 | A |
| sw1 | n | hv1 | B |
| sw1 | n | hv1 | C |
| sw1 | n | hv1 | D |

FIG. 14

| SWITCH ID | PORT NUMBER | HYPERVISOR ID | MAC ADDRESS OF NETWORK ADAPTER |
|---|---|---|---|
| sw1 | n | hv1 | A |
| sw1 | n | hv1 | B |
| sw1 | n | hv1 | C |
| sw1 | n | hv1 | D |
| sw2 | m | hv1 | E |
| sw3 | p | hv1 | F |

FIG. 18

| NETWORK ADAPTER ID | MAC ADDRESS | LOCATION INFORMATION | VIRTUAL SWITCH ID | IP ADDRESS OF VIRTUAL NETWORK ADAPTER | HYPERVISOR ID |
|---|---|---|---|---|---|
| na11 | A | 06:00.0 | vsw1 | 1.1.1.1 | hv1 |
| na12 | B | 06:00.1 | vsw2 | 2.2.2.2<br>3.3.3.3 | hv1 |
| na13 | C | 06:00.2 | vsw3 | 4.4.4.4 | hv1 |
| na14 | D | 06:00.3 | vsw4 | 5.5.5.5 | hv1 |

FIG. 19

| SWITCH ID | PORT NUMBER | COUPLING DESTINATION MAC ADDRESS |
|---|---|---|
| sw1 | 1 | |
| ⋮ | ⋮ | ⋮ |
| sw1 | n | A |
| sw2 | 1 | |
| ⋮ | ⋮ | ⋮ |
| sw2 | m | C |

FIG. 22

| SWITCH ID | PORT NUMBER | HYPERVISOR ID | MAC ADDRESS OF NETWORK ADAPTER |
|---|---|---|---|
| sw1 | n | hv1 | A |
| sw1 | n | hv1 | B |

FIG. 23

| SWITCH ID | PORT NUMBER | HYPERVISOR ID | MAC ADDRESS OF NETWORK ADAPTER |
|---|---|---|---|
| sw1 | n | hv1 | A |
| sw1 | n | hv1 | B |
| sw2 | m | hv1 | C |
| sw2 | m | hv1 | D |

INFORMATION PROCESSING APPARATUS AND METHOD FOR GENERATING COUPLING INFORMATION

CROSS-REFERENCE TO RELATED APPLICATION

This application is based upon and claims the benefit of priority of the prior Japanese Patent Application No. 2013-054641, filed on Mar. 18, 2013, the entire contents of which are incorporated herein by reference.

FIELD

The embodiments discussed herein are related to a technique of generating coupling information of a network.

BACKGROUND

Typically, Link Layer Discovery Protocol (LLDP) is utilized to obtain information on the coupling between a port of a network switch and a network adapter of an apparatus coupled to the port. The LLDP is a protocol for performing various kinds of setting or administration by detecting a coupling destination node. For example, as illustrated in FIG. 1, when a network adapter 1001 of a physical server and a port n of a network switch sw1 are coupled to each other, the LLDP enables the network switch sw1 to recognize that a media access control (MAC) address of the network adapter 1001 to which the network switch sw1 is coupled indicates "A". When the configuration is simple as illustrated in FIG. 1, in which the network adapter 1001 is not logically divided and the physical server includes only one network adapter, the coupling relation may be ascertained by searching for the physical server that has the MAC address "A" in another manner.

In FIG. 2, a physical network adapter 1002 is divided into a plurality of logical network adapters 1002a, 1002b, 1002c, and 1002d. The MAC addresses of the logical network adapters 1002a, 1002b, 1002c, and 1002d indicate "A", "B", "C", and "D", respectively. When the MAC address of the coupling destination node is acquired in the network switch sw1 via the LLDP, only one MAC address, which is for example, the MAC address "A", may be obtained while it is unclear which port of which network switch the nodes corresponding to the other MAC addresses "B" to "D" are coupled to. In such a case, when some network failure occurs, the range in which a virtual machine implemented on a hypervisor exerts influence, or the like may not be grasped properly. Examples of related art include Japanese Laid-open Patent Publication No. 2011-203810, Japanese Laid-open Patent Publication No. 2007-316724, and Japanese Laid-open Patent Publication No. 2010-124129.

SUMMARY

According to an aspect of the invention, a processing apparatus includes a memory, and a processor coupled to the memory and configured to acquire first data that indicates correspondence relationship between a first address given to a first adapter of a first device and a first bus number given to a first bus coupled to the first adapter, acquire second data that indicates correspondence relationship between a second address given to a second adapter of a first device and a second bus number given to a second bus coupled to the second adapter, acquire third data that indicates correspondence relationship between the first address and a port number given to a port of a second device, the port being coupled to the first adapter with the first bus, and when the second bus number is identical to the first bus number, generate fourth data that indicates that the second adapter is coupled to the port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of server data according to the first embodiment;

FIG. 9 illustrates an example of switch data according to the first embodiment;

FIG. 11 illustrates a first state of a coupling data table according to the first embodiment;

FIG. 12 illustrates a second state of the coupling data table according to the first embodiment;

FIG. 14 illustrates a third state of the coupling data table according to the first embodiment;

FIG. 18 illustrates an example of server data according to the second embodiment;

FIG. 19 illustrates an example of switch data according to the second embodiment;

FIG. 22 illustrates a first state of a coupling data table according to the second embodiment;

FIG. 23 illustrates a second state of the coupling data table according to the second embodiment.

DESCRIPTION OF EMBODIMENTS

First Embodiment

Figure 1:
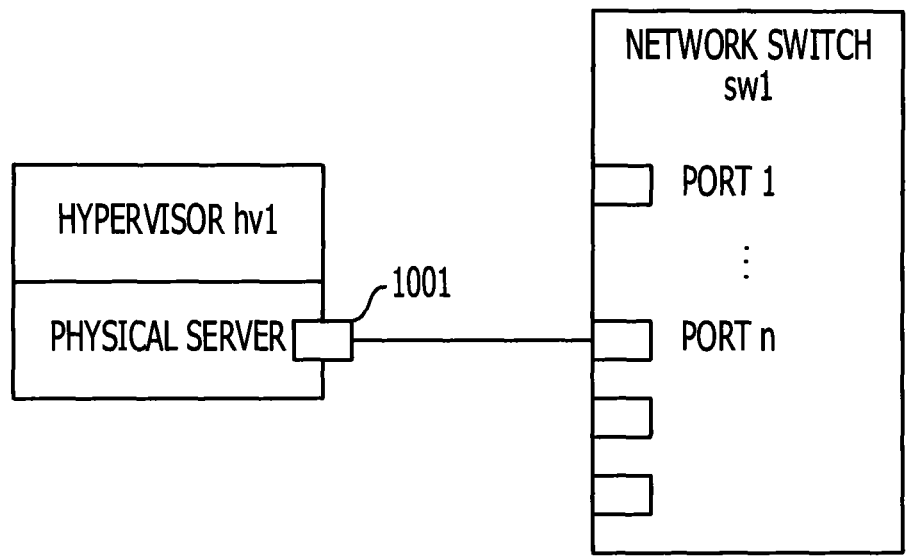
FIG. 1 illustrates an example of a simple coupling relation.
Figure 2:
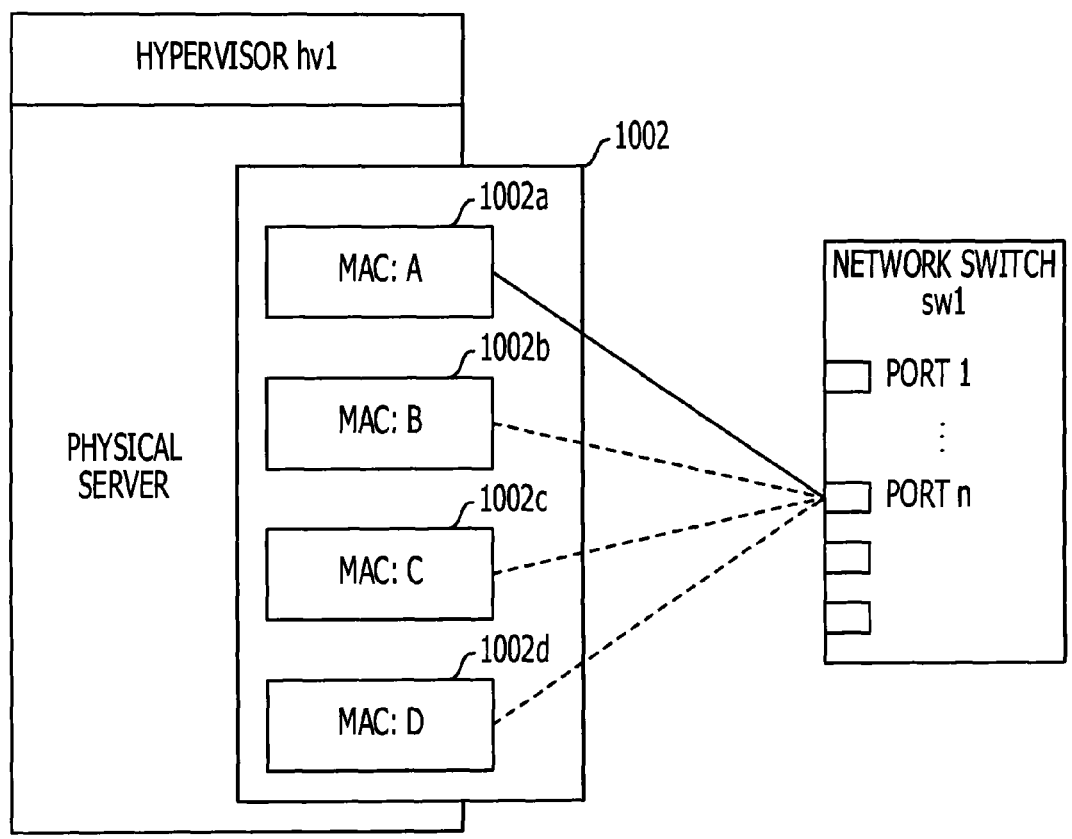
FIG. 2 illustrates an example of a complicated coupling relation.
Figure 3:
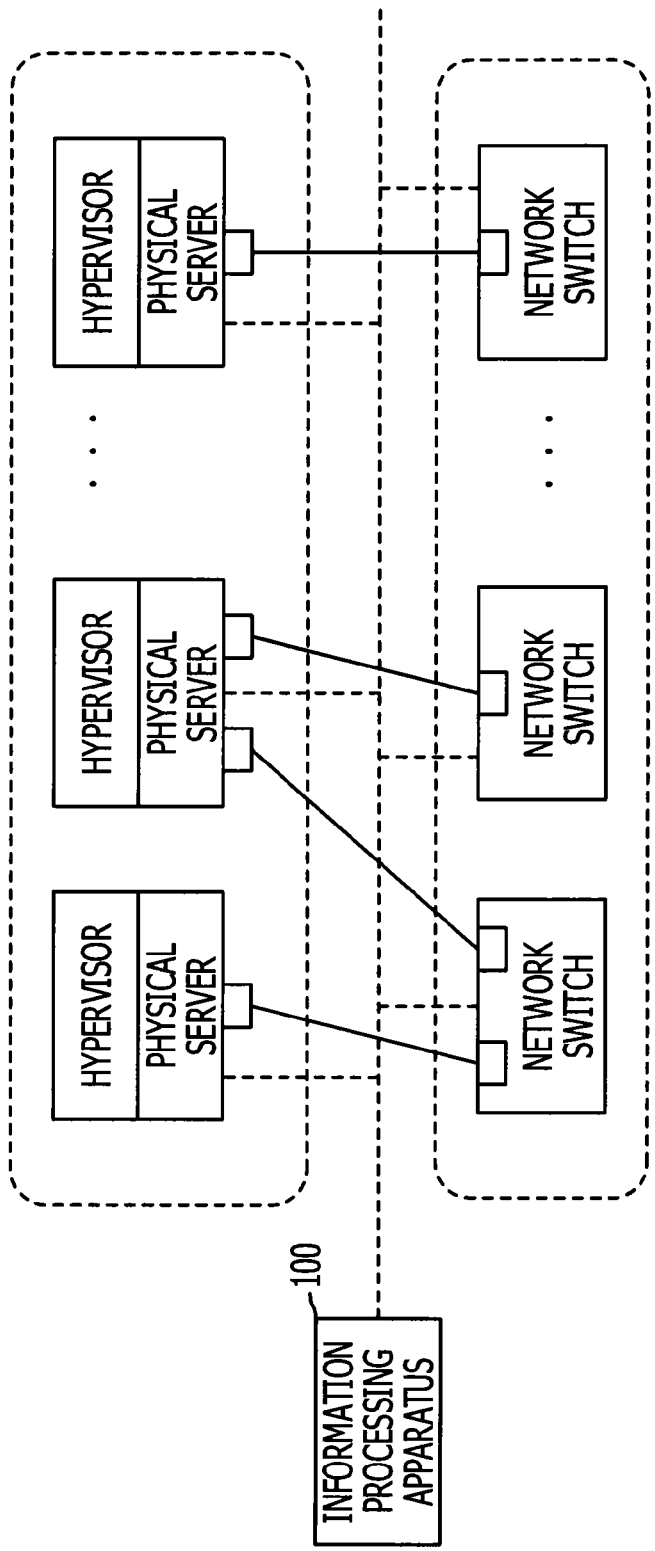
FIG. 3 illustrates a coupling state in a network.

In a first embodiment, as illustrated in FIG. 3, a plurality of physical servers are coupled to a plurality of network switches while one or more of the physical servers include a network adapter logically divided. An information processing apparatus 100, which performs main processes in the present embodiment, is coupled to each of the physical servers and each of the network switches through a local area network (LAN) for management 200.

Figure 4:
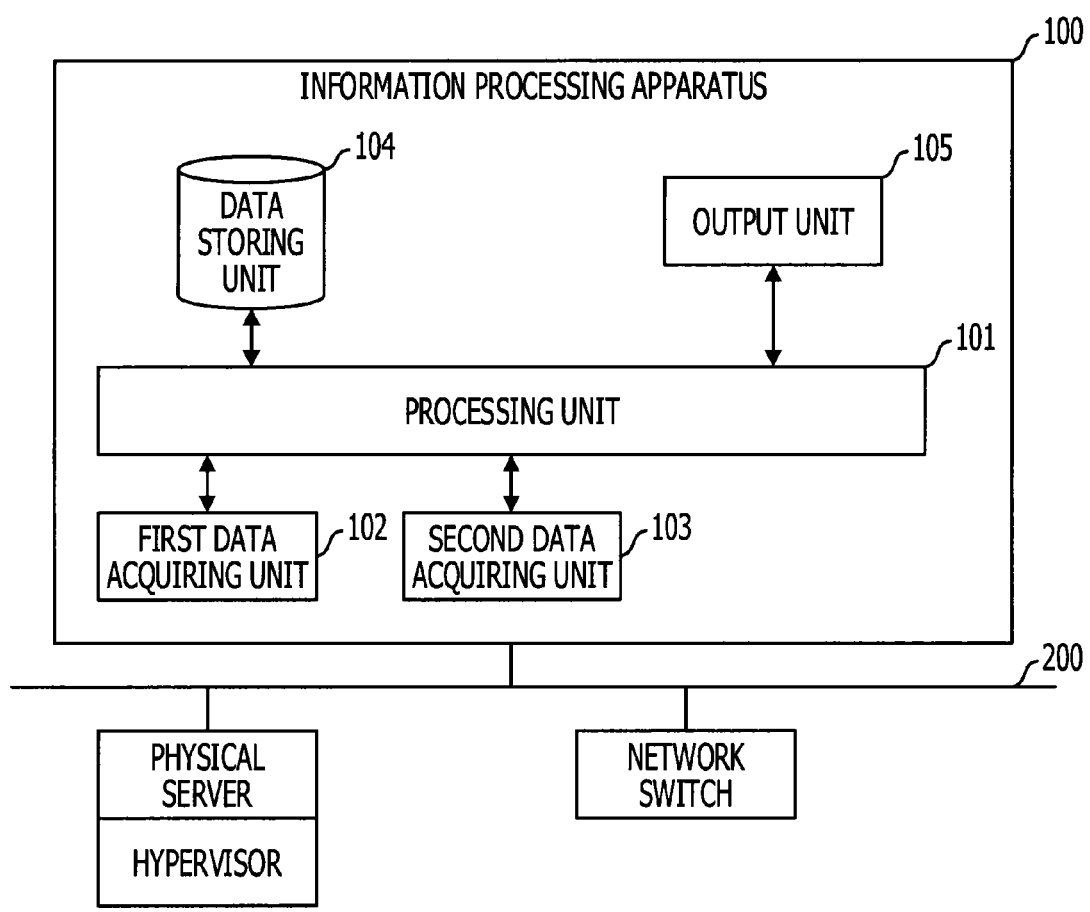
FIG. 4 is a function block diagram illustrating an information processing apparatus according to a first embodiment.

FIG. 4 is a function block diagram illustrating the information processing apparatus 100. As described above, the information processing apparatus 100 is coupled to the LAN for management 200 to which the plurality of physical servers and network switches are coupled, and includes a processing unit 101, a first data acquiring unit 102, a second data acquiring unit 103, a data storing unit 104, and an output unit 105.

The first data acquiring unit 102 acquires server data from each hypervisor and causes the server data to be stored in the data storing unit 104. The second data acquiring unit 103 acquires switch data from each network switch and causes the switch data to be stored in the data storing unit 104. The processing unit 101 generates coupling information of the network by performing processes using the server data and the switch data stored in the data storing unit 104, and causes the generated coupling information to be stored in the data storing unit 104 as, for example, a coupling data table. The output unit 105 outputs the coupling information of the network stored in the data storing unit 104 to, for example, a display device, a printing device, or another computer coupled through the network.

Figure 5:
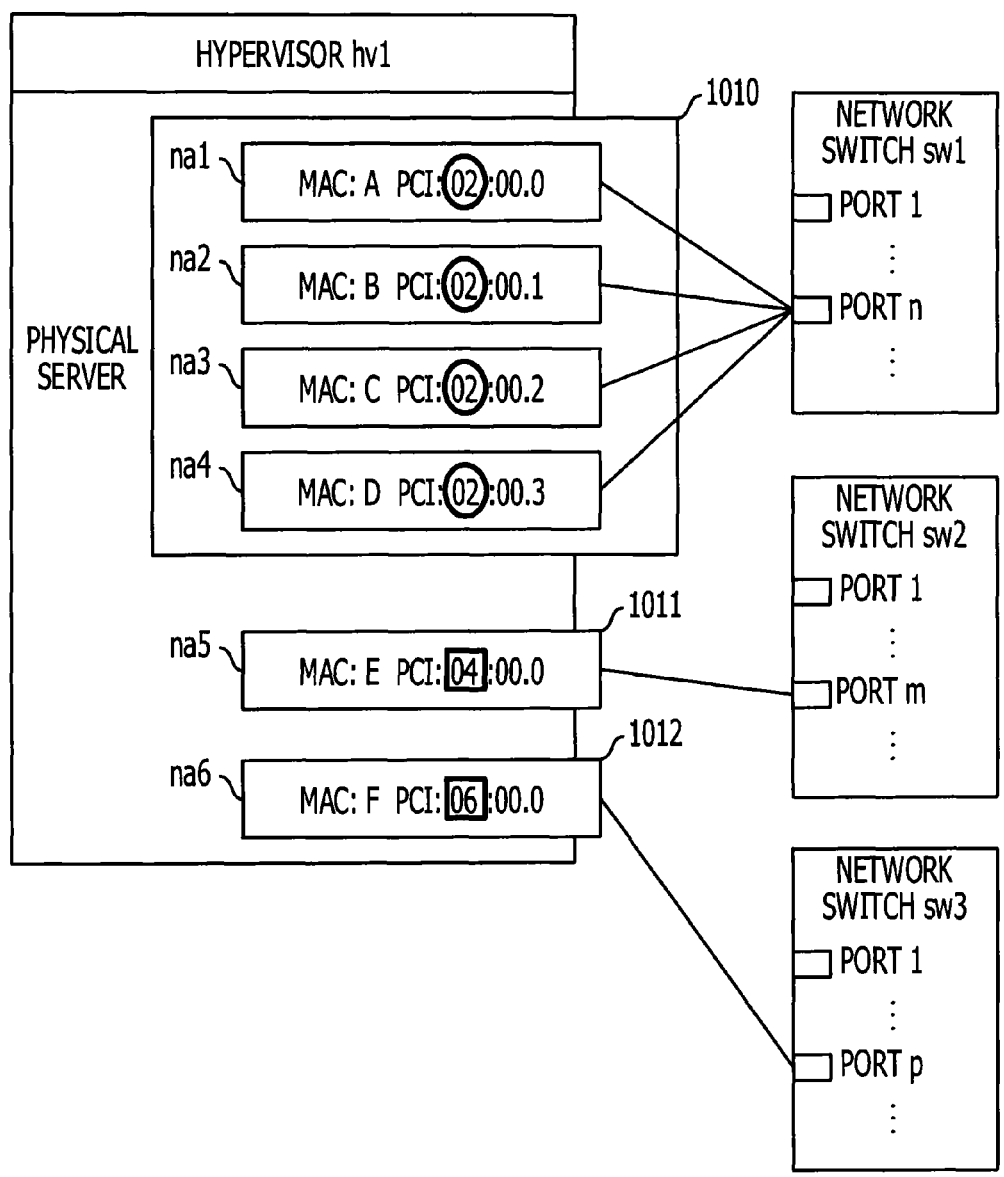
FIG. 5 illustrates a specific example of a coupling state according to the first embodiment.

For example, the coupling state illustrated in FIG. 5 is assumed so as to facilitate the description below. That is, the physical server managed by a hypervisor hv1 includes network adapters 1010 to 1012. The network adapter 1010 is logically divided into four while the network adapters 1011 and 1012 are not logically divided. The physical network adapter 1010 includes logical network adapters na1 to na4, which have MAC addresses of "A", "B", "C", and "D", respectively. The hypervisor hv1 may recognize na1 to na4 as identifiers. On the side of the hypervisor hv1, the physical network adapter 1011 is identified as a network adapter corresponding to an identifier na5, and the physical network adapter 1012 is identified as a network adapter corresponding to an identifier na6.

Figure 6:
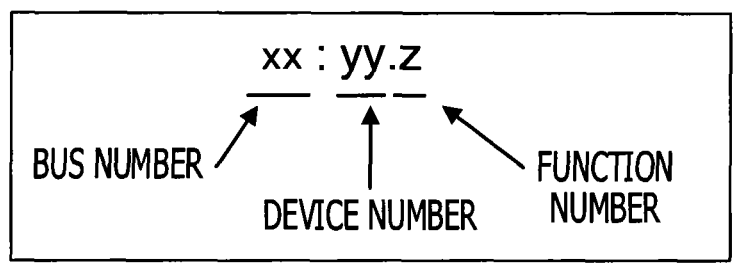
FIG. 6 is a diagram for explaining location information on a peripheral component interconnect (PCI) bus.
Figure 7:
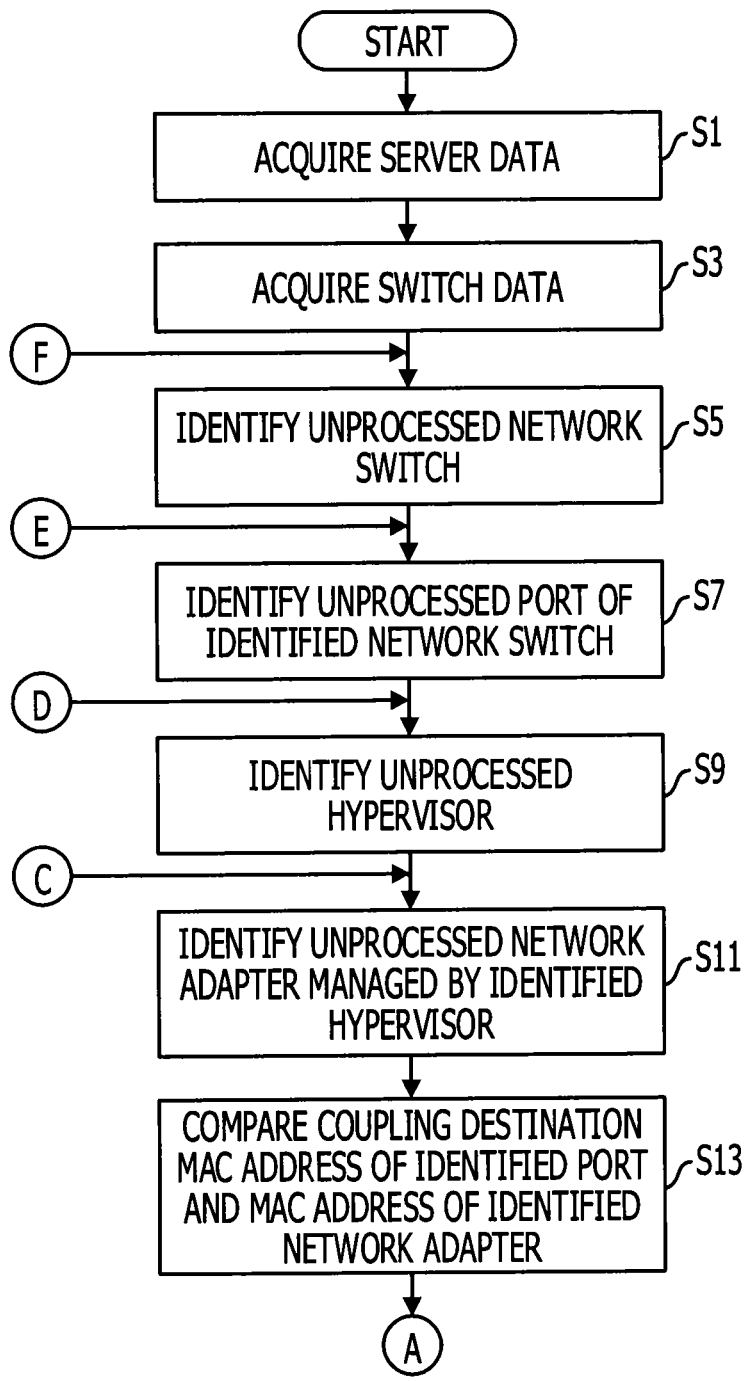
FIG. 7 is a flowchart illustrating a process according to the first embodiment.

The network adapters are coupled to peripheral component interconnect (PCI) buses, and each logical device is provided with location information on the PCI bus. For example, the logical network adapter na1 is provided with location information "02:00.0", the logical network adapter na1 is provided with location information "02:00.1", the logical network adapter na3 is provided with location information "02:00.2", the logical network adapter na4 is provided with location information "02:00.3", the logical network adapter na5 is provided with location information "04:00.0", and the logical network adapter na6 is provided with location information "06:00.0". In the location information, as illustrated in FIG. 6, xx represents a bus number, yy represents a device number, and z represents a function number. The logical network adapters na1 to na4 of the identical physical network adapter 1010 have an identical bus number. In the example of FIG. 5, all the bus numbers of the logical network adapters na1 to na4 indicate "02", which is not identical with the bus numbers in the location information on the physical network adapters 1011 and 1012 different from the physical network adapter 1010.

Furthermore, in this example, the physical network adapter 1010 is coupled to a port n of a network switch sw1, the physical network adapter 1011 is coupled to a port m of a network switch sw2, and the physical network adapter 1012 is coupled to a port p of a network switch sw3.

Referring now to FIGS. 7 to 14, the operations performed by the information processing apparatus 100 are described. First, the first data acquiring unit 102 outputs a request to each of the hypervisors to acquire server data from the hypervisors, and causes the server data to be stored in the data storing unit 104 (S1). In the case illustrated in FIG. 5, the data illustrated in FIG. 8 is acquired from the hypervisor hv1. The data in the example of FIG. 8 includes a plurality of combinations, each of which is made up of an identifier (ID) of a logical network adapter, a MAC address, and location information, and an identifier of a hypervisor.

After that, the second data acquiring unit 103 outputs a request to each of the network switches to acquire switch data from the network switches, and causes the switch data to be stored in the data storing unit 104 (S3). In the case illustrated in FIG. 5, the data illustrated in FIG. 9 is acquired from the network switches. The data in the example of FIG. 9 includes a plurality of combinations, each of which is made up of a switch ID, a port number, and a coupling destination MAC address.

After that, the processing unit 101 identifies one unprocessed network switch in the switch data (S5).

Also, the processing unit 101 identifies one unprocessed port of the identified network switch in the switch data (S7).

Additionally, the processing unit 101 identifies one unprocessed hypervisor in the server data (S9).

Furthermore, the processing unit 101 identifies one unprocessed network adapter server data managed by the identified hypervisor (S11).

After that, the processing unit 101 compares the coupling destination MAC address of the port identified in S7 and the MAC address of the network adapter identified in S11 (S13). After that, the process moves on to the process of FIG. 10 through a terminal A.

Figure 10:
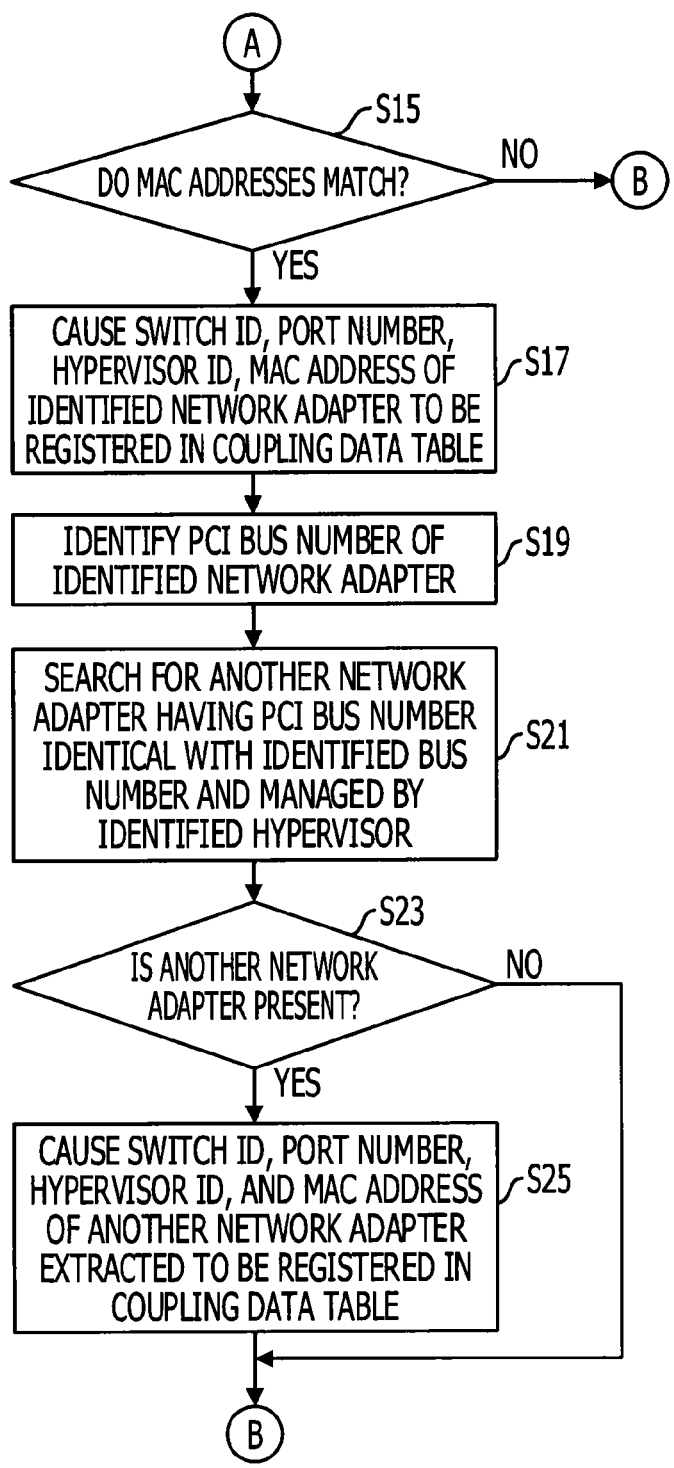
FIG. 10 is a flowchart illustrating a process according to the first embodiment.

The process of FIG. 10 is described now. The processing unit 101 determines whether the MAC addresses compared in S13 match (S15). When the MAC addresses do not match, the process moves on to the process of FIG. 13 through a terminal B.

When the MAC addresses match, the processing unit 101 causes the switch ID, the port number, the hypervisor ID, and the MAC address of the identified network adapter to be registered in the coupling data table of the data storing unit 104 (S17). For example, when the switch ID "sw1", the port number "n", the coupling destination MAC address "A", the hypervisor ID "hv1", the network adapter ID "na1", and the MAC address "A" are processed, the data illustrated in FIG. 11 is stored in the coupling data table.

Also, the processing unit 101 identifies the PCI bus number of the network adapter identified in S11 based on the server data (S19). In the above-described example, "02" is identified as indicated in FIG. 8.

After that, the processing unit 101 searches for another network adapter that has a PCI bus number identical with the identified bus number and is managed by the identified hypervisor in the server data (S21). In the above-described example, when another network adapter ID with the PCI bus number "02" is searched for except "na1" in the location information with which the hypervisor ID "hv1" is correlated, "na1", "na3", and "na4" are obtained.

After that, the processing unit 101 determines whether or not another network adapter has been extracted in S21 (S23). For example, when processing the network adapter ID "na5" or "na6", another network adapter, which satisfies such conditions, may not be extracted. When another network adapter, which satisfies such conditions, is not extracted, the process moves on to the process of FIG. 13 through the terminal B.

When another network adapter is extracted, the processing unit 101 causes the switch ID, the port number, the hypervisor ID, and the MAC address of the another network adapter having been extracted to be registered in the coupling data table in the data storing unit 104 (S25). Then, the process moves on to the process of FIG. 13 through the terminal B.

In the above-described example, the MAC address "B" corresponding to the network adapter "na2", the MAC address "C" corresponding to the network adapter "na3", and the MAC address "D" corresponding to the network adapter "na4" are registered. That is, the coupling data table is changed as illustrated in FIG. 12. FIG. 12 illustrates that four different MAC addresses are registered even when the switch IDs, the port numbers, and the hypervisor IDs each are identical.

Since the MAC addresses corresponding to the network adapters "na1", "na3", and "na4" extracted in S21 have already been registered in the coupling data table, the network adapters "na2", "na3", and "na4" may be treated as processed network adapters in S11.

Figure 13:
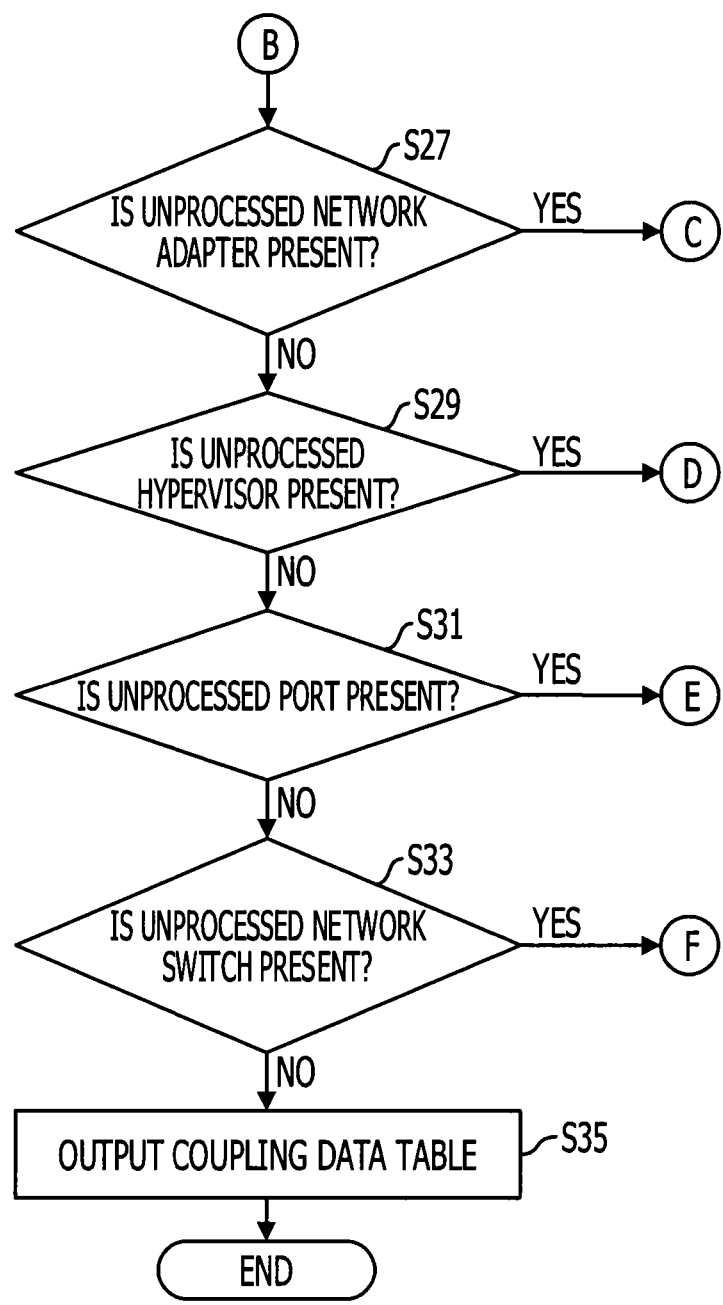
FIG. 13 is a flowchart illustrating a process according to the first embodiment.

The process of FIG. 13 is described now. The processing unit 101 determines whether an unprocessed network adapter is present in the server data (S27). When an unprocessed network adapter is present, the process returns to S11 through a terminal C. When no unprocessed network adapter is present, the processing unit 101 determines whether an unprocessed hypervisor is present in the server data (S29). When an unprocessed hypervisor is present, the process returns to S9 through a terminal D. When no unprocessed hypervisor is present, the processing unit 101 determines whether an unprocessed port is present in the switch data (S31). When an unprocessed port is present, the process returns to S7 through a terminal E. When no unprocessed port is present, the processing unit 101 determines whether an unprocessed network switch is present in the switch data (S33). When an unprocessed network switch is present, the process returns to S5 through a terminal F. When no unprocessed network switch is present, the output unit 105 outputs the coupling data table (S35) and the process ends.

The coupling data table illustrated in FIG. 14 may be obtained by performing the processes described above. Since the physical network adapters 1011 and 1012 are not logically divided, addition by one record is performed for the network switches sw2 and sw3.

When the coupling data table described above may be obtained, the network configuration may be correctly grasped and in case of failure occurrence, for example, the failure causing portion or the range in which the failure exerts influence may be easily identified. Also, since how the network is logically divided may be known, resources may be utilized advantageously by, for example, changing the virtualization environment so that the virtualization environment is suitable for the allocation of bands for the logical division. That is, the operational management of the network may be facilitated and costs desired for the operational management may be reduced.

Second Embodiment

Figure 15:
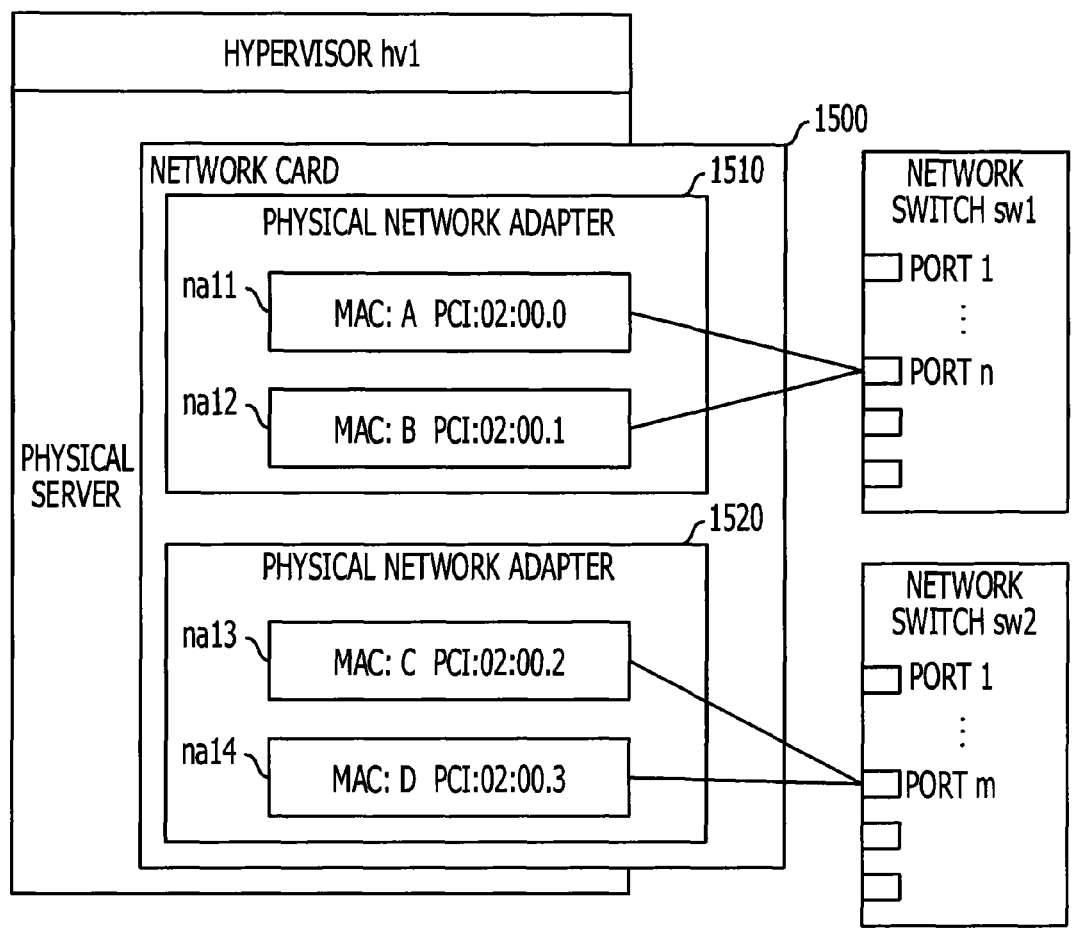
FIG. 15 illustrates a coupling state in a network.

In a second embodiment, as illustrated in FIG. 15, one physical network card 1500 is coupled to a physical server and the physical network card 1500 is provided with two physical network adapters 1510 and 1520, each of which is logically divided. That is, a hypervisor hv1 grasps that logical network adapters na11 to na14 are provided. The MAC address of the logical network adapter na11 indicates "A" and the PCI location information on the logical network adapter na11 indicates "02:00.0". The MAC address of the logical network adapter na12 indicates "B" and the PCI location information on the logical network adapter na12 indicates "02:00.1". The MAC address of the logical network adapter na13 indicates "C" and the PCI location information on the logical network adapter na13 indicates "02:00.2". The MAC address of the logical network adapter na14 indicates "D" and the PCI location information on the logical network adapter na14 indicates "02:00.3". A port n of a network switch sw1 is coupled to the physical network adapter 1510, and a port m of a network switch sw2 is coupled to the physical network adapter 1520.

In the state in which one network card is provided with a plurality of physical network adapters as described above, the PCI location information indicates the identical bus numbers and this situation may not be handled in the first embodiment.

Figure 16:
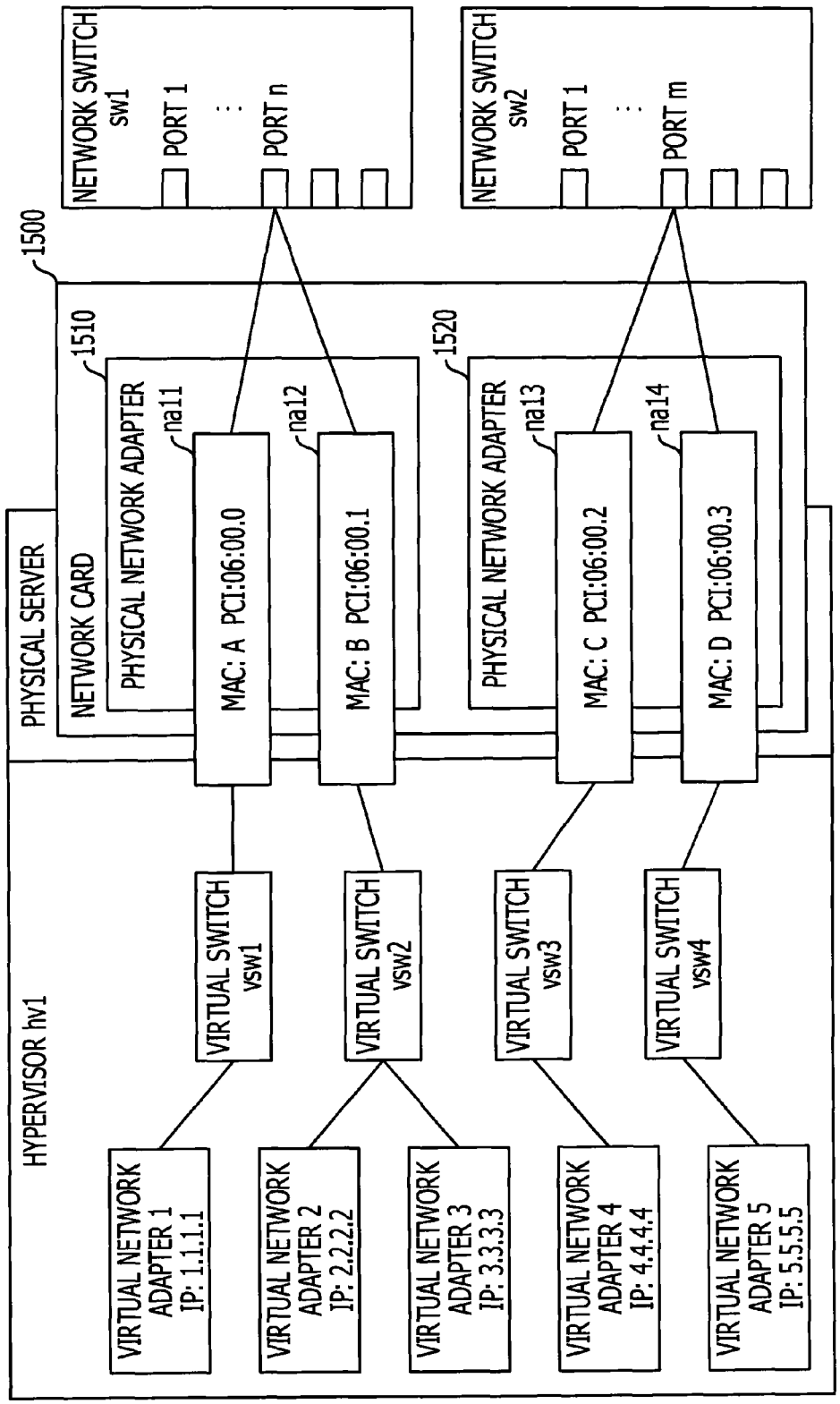
FIG. 16 illustrates relations among virtual machines, virtual switches, and logical switch adapters.

However, as illustrated in FIG. 16, the hypervisor hv1 grasps the relations between virtual network adapters of virtual machines and the logical network adapters of the network card. In the example of FIG. 16, a virtual network adapter 1 of the virtual machine is coupled to the logical network adapter na11 through a virtual switch vsw1, virtual network adapters 2 and 3 of the virtual machines are coupled to the logical network adapter na12 through a virtual switch vsw2. Furthermore, a virtual network adapter 4 of the virtual machine is coupled to the logical network adapter na13 through a virtual switch vsw3, and a virtual network adapter 5 of the virtual machine is coupled to the logical network adapter na14 through a virtual switch vsw4. Each of the virtual network adapters is provided with an IP address.

When data on the virtual coupling relation described above may be acquired, even if the bus numbers in the PCI location information are identical, it may be found that the port n of the network switch sw1 is unable to communicate with the virtual network adapter 4 that has an IP address of "4.4.4.4" and the virtual network adapter 5 that has an IP address of "5.5.5.5". Similarly, it may be found that the port m of the network switch sw2 is unable to communicate with the virtual network adapter 1 that has an IP address of "1.1.1.1", the virtual network adapter 2 that has an IP address of "2.2.2.2", and the virtual network adapter 3 that has an IP address of "3.3.3.3".

When data on such virtual coupling relations may also be collected as the server data, a coupling data table may be generated.

Figure 17:
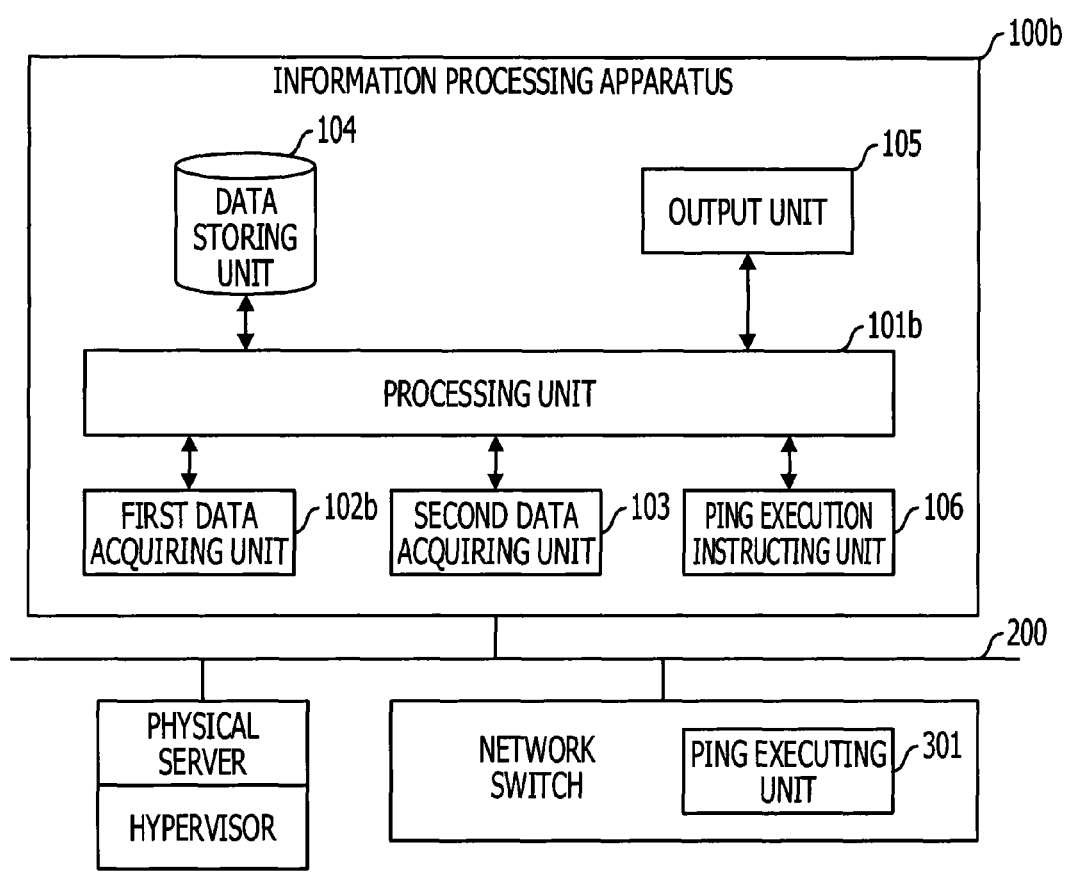
FIG. 17 is a function block diagram illustrating an information processing apparatus according to a second embodiment.
Figure 20:
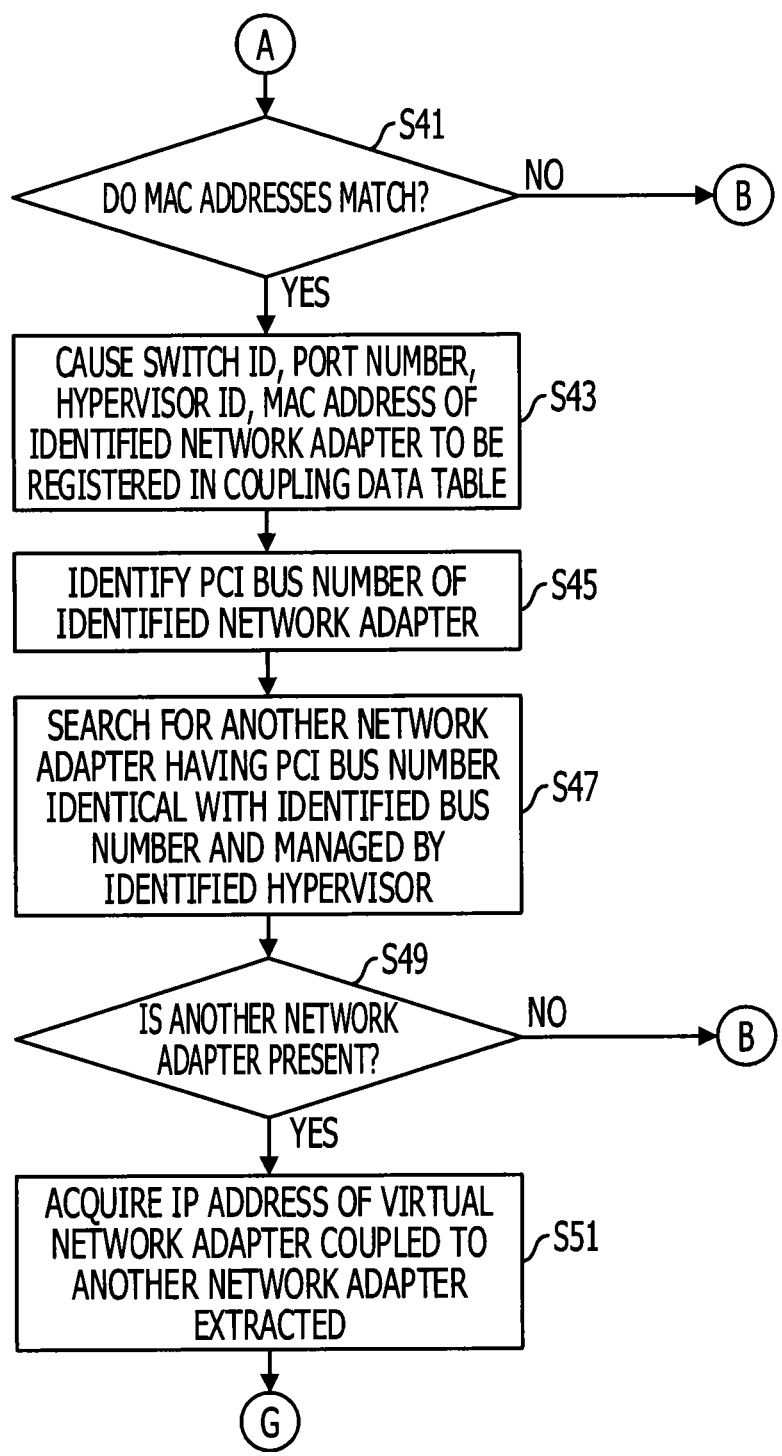
FIG. 20 is a flowchart illustrating a process according to the second embodiment.
Figure 21:
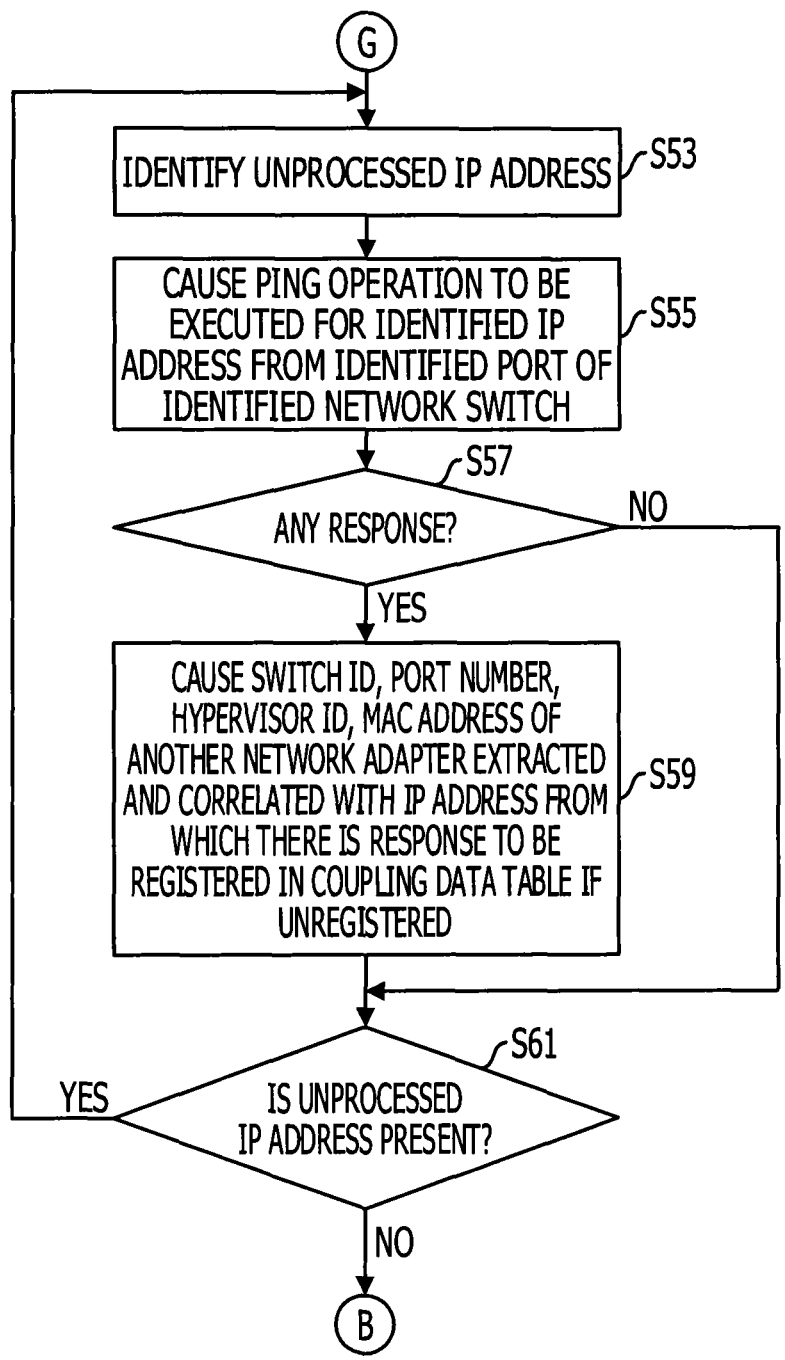
FIG. 21 is a flowchart illustrating a process according to the second embodiment.

Thus, an information processing apparatus 100b is configured as illustrated in FIG. 17. The information processing apparatus 100b differs from the information processing apparatus 100 according to the first embodiment, which is illustrated in FIG. 4, in that a ping execution instructing unit 106 is provided, and that since the contents of the server data to be acquired are different, a first data acquiring unit 102b is provided instead of the first data acquiring unit 102, and that since the processes to be performed are partially different, a processing unit 101b is provided instead of the processing unit 101. Additionally, another difference is that the network switch is provided with a ping executing unit 301 that executes a ping operation in accordance with an instruction from the ping execution instructing unit 106.

Referring now to FIGS. 18 to 23, the processes performed by the information processing apparatus 100b are described. Among the processes according to the first embodiment, the process performed from the terminal A to the terminal B is replaced with the processes illustrated in FIGS. 20 and 21. The server data acquired by the first data acquiring unit 102*b* in S1 is illustrated in FIG. 18. The data in the example of FIG. 18 includes a plurality of combinations, each of which is made up of a network adapter ID, a MAC address, location information, a virtual switch ID, an IP address of a virtual network adapter, and a hypervisor ID. In the example of FIG. 16, two virtual network adapters corresponding to two respective IP addresses are coupled to the virtual switch vsw2.

The switch data acquired by a second data acquiring unit 103 according to the second embodiment are substantially the same in contents as the switch data acquired by the second data acquiring unit 103 according to the first embodiment, and when the coupling relations are made as illustrated in FIG. 16, the switch data illustrated in FIG. 19 may be acquired.

The process performed after the terminal A is described now. The processing unit 101*b* determines whether the MAC addresses compared in S13 match (S41). When the MAC addresses do not match, the process moves on to the process of FIG. 13 through the terminal B.

When the MAC addresses match, the processing unit 101*b* causes the switch ID, the port number, hypervisor ID, and the MAC address of the identified network adapter to be registered in the coupling data table in a data storing unit 104 (S43). For example, when the switch ID "sw1", the port number "n", the hypervisor ID "hv1", and the MAC address "A" of the network adapter "na11" are processed, similar to the first embodiment, the data illustrated in FIG. 11 is stored in the coupling data table.

The processing unit 101*b* identifies the PCI bus number of the network adapter identified in S11 based on the server data (S45). In the above-described example, "06" is identified as indicated in FIG. 18.

After that, the processing unit 101*b* searches for another network adapter that has a PCI bus number identical with the identified bus number and is managed by the identified hypervisor in the server data (S47). In the above-described example, when another network adapter ID with the PCI bus number "06" is searched for except "na11" in the location information with which the hypervisor ID "hv1" is correlated, "na12", "na13", and "na14" are obtained.

After that, the processing unit 101*b* determines whether or not another network adapter has been extracted in S47 (S49). In the example of FIG. 18, the network adapter that does not satisfy the conditions is not present and when the network adapter that satisfies the conditions is not extracted, the process moves on to the process of FIG. 13 through the terminal B.

When another network adapter is extracted, the processing unit 101*b* acquires the IP address of the virtual network adapter coupled to the another network adapter having been extracted from the server data (S51). When a plurality of virtual network adapters are correlated with the network adapter, such as "na12" in FIG. 18, one representative IP address may be extracted instead of extracting a plurality of IP addresses. After that, the process moves on to the process of FIG. 21 through a terminal G.

The processing unit 101*b* identifies one unprocessed IP address in the acquired IP addresses (S53). Then, the processing unit 101*b* causes the ping execution instructing unit 106 to instruct the ping executing unit 301 to execute a ping operation for the identified IP address from the identified port of the identified network switch (S55). The ping executing unit 301 of the identified network switch replies to the ping execution instructing unit 106 regarding the presence or absence of a response, and the ping execution instructing unit 106 notifies the processing unit 101*b* of the presence or absence of a response.

In the above-described example, there is a response from the IP address "2.2.2.2" or "3.3.3.3" correlated with the network adapter "na12" while there is no response from the IP addresses "4.4.4.4" and "5.5.5.5" correlated with the network adapters "na13" and "na14", respectively.

The processing unit 101*b* determines whether the notification indicating there is a response is received (S57). When the notification indicating there is no response is received, the process moves on to S61. When the notification indicating there is a response is received, the processing unit 101*b* causes the switch ID, the port number, the hypervisor ID, and the MAC address of another network adapter extracted and correlated with the IP address from which there is a response to be registered in the coupling data table if they are unregistered (S59). Then, the coupling data table illustrated in FIG. 22 may be obtained.

After that, the processing unit 101*b* determines whether or not an unprocessed IP address is present in the IP addresses acquired in S51 (S61). When an unprocessed IP address is present, the process returns to S53. When no unprocessed IP address is present, the process moves on to the process of FIG. 13 through the terminal B.

In the end, the coupling data table illustrated in FIG. 23 may be obtained.

By performing the processes described above, the coupling data table may be obtained even when a plurality of physical network adapters exist in one network card and moreover, the physical network adapters are logically divided.

The present application is not limited to the embodiments described above. The function block diagrams in FIGS. 4 and 17 are mere examples and may differ from the configurations of program modules. Furthermore, in the processes described above, some processes may be performed in a different order or a plurality of steps may be performed in parallel as long as the results of the processes remain unchanged.

Figure 24:
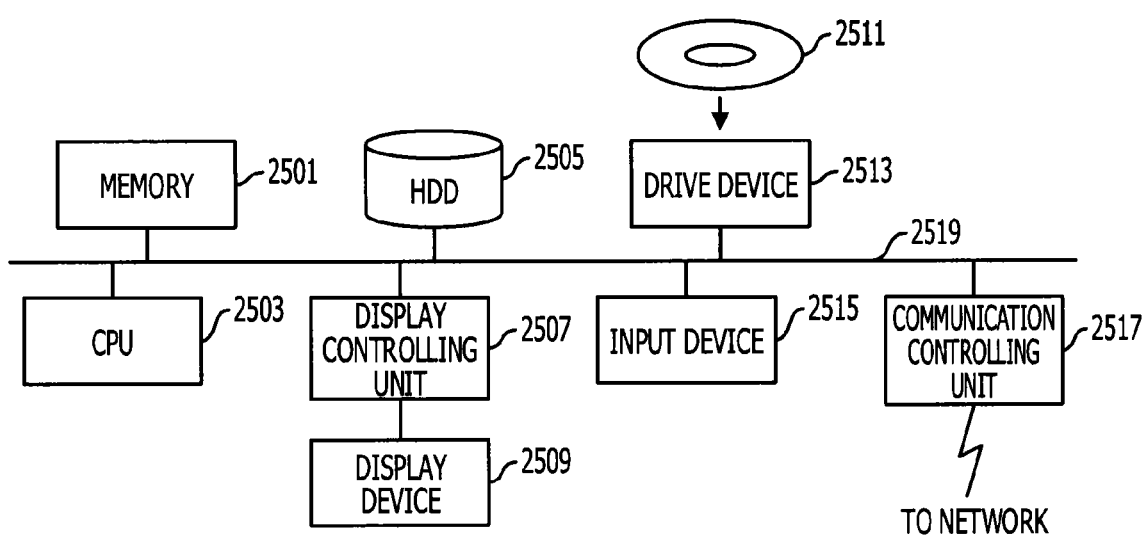
FIG. 24 is a function block diagram illustrating a computer.

The above-described information processing apparatuses 100 and 100*b* are computer apparatuses, in which for example, as illustrated in FIG. 24, memory 2501, a central processing unit (CPU) 2503, a hard disk drive (HDD) 2505, a display controlling unit 2507 coupled to a display device 2509, a drive device 2513 for a removable disc 2511, an input device 2515, and a communication controlling unit 2517 for being coupled to a network are coupled through a bus 2519. An operating system (OS) and an application program for performing the processes according to the present embodiments are stored in the HDD 2505, and when executed by the CPU 2503, are read from the HDD 2505 to the memory 2501. Depending on the processes of the application program, the CPU 2503 controls the display controlling unit 2507, the communication controlling unit 2517, and the drive device 2513, which are thus caused to perform certain operations. In-process data is stored mainly in the memory 2501, but may also be stored in the HDD 2505. In the embodiments of the present application, the application program for performing the above-described processes is stored in the computer-readable removable disc 2511 and distributed, and installed from the drive device 2513 into the HDD 2505. The application program may also be installed into the HDD 2505 via a network, such as the Internet, and the communication controlling unit 2517. Such a computer apparatus implements various functions as described above when the hardware, such as the CPU 2503 and the memory 2501, and the OS and a program, such as the application program, which are described above, cooperate systematically.

The above-described present embodiments may be rephrased as below.

The information processing method according to the present embodiments includes the processes of (A) acquiring first correlation data that includes a port identifier and a first address of a coupling destination device for each port of a communication device, (B) acquiring second correlation data that includes the first address and location information on a logical adapter for each logical adapter of the coupling destination device of the communication device, and (C) when the first correlation data and the second correlation data including the first addresses that match each other are detected, identifying another second correlation data that includes certain data identical to certain data included in the location information on the logical adapter, and generating coupling information on the coupling between the communication device and the coupling destination device based on the first correlation data and the detected second correlation data, which include the matching first addresses, and the another identified second correlation data.

To use the location information as described above may bring the coupling information even when the adapter is logically divided.

The above-described second correlation data may further include a second address of a virtual device correlated with the logical adapter. In this case, the above-described generation process may include (c1) causing the second address of the virtual device included in the another identified second correlation data to be accessed from a port of the communication device related to the first correlation data that includes the matching first address, and being notified of the presence or absence of a response, and (c2) generating the coupling information based on the presence or absence of a response. Then, even when the location information only is not sufficient for the distinction, the coupling information may be obtained desirably.

Also, the above-described generation process may be a process of generating coupling information based on the second correlation data that includes the second address from which there is a response and the first correlation data that includes the matching first address.

The above-described coupling information may further include data that correlates the identifier, the port identifier, and the first address of the communication device. Additionally, the identifier of the hypervisor or the identifier of the physical device may be correlated.

Furthermore, the above-described certain data may be the bus number. The identical bus numbers may indicate existence on the same physical adapter or adapter card.

A program for causing a computer to perform the above-described processes may be created, and the program is stored in a computer-readable recording medium or a storage device, which is for example, a flexible disc, an optical disc such as a compact disc read-only memory (CD-ROM), a magneto-optical disc, semiconductor memory such as ROM, or a hard disk. In-process data is temporarily saved in a storage device, such as random-access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing apparatus configured to be coupled to a first device including a physical adapter and a second device including a port coupled to the physical adapter, the processing apparatus comprising:
   a memory; and
   a processor coupled to the memory and configured to:
   acquire, from the first device, first information that indicates a correspondence relationship between a first address given to a first logical adapter of a plurality of logical adapters included in the physical adapter and a first bus number given to a first bus coupled to the first logical adapter,
   acquire, from the first device, second information that indicates a correspondence relationship between a second address given to a second logical adapter of the plurality of logical adapters and a second bus number given to a second bus coupled to the second logical adapter,
   acquire, from the second device, third information that indicates a correspondence relationship between the first address and a port number given to the port of the second device,
   detect that the second bus number given to the second bus coupled to the second logical adapter is identical to the first bus number given to the first bus coupled to the first logical adapter, and
   generate fourth information that indicates that the second logical adapter is coupled to the port.

2. The processing apparatus according to claim 1, wherein
   the first device performs as a third device and a fourth device,
   the third device includes a third adapter coupled to the first logical adapter, and the fourth device includes a fourth adapter coupled to the second logical adapter,
   the third adapter includes a third address, and the fourth adapter includes a fourth address, and
   the processor is configured to:
   make the second device to access from the port to the third address and the fourth address, and
   generate the fourth information when a response from the fourth adapter is executed.

3. The processing apparatus according to claim 1, wherein
   the first logical adapter is a first logical network adapter using the physical adapter, and the second logical adapter is a second logical network adapter using the physical adapter.

4. The processing apparatus according to claim 1, wherein
   the fourth information includes data that corresponds an identifier to identify the second device, the port number, the first address and the second address.

5. A method executed by a computer configured to be coupled to a first device including a physical adapter and a second device including a port coupled to the physical adapter, the method comprising:
   acquiring, from the first device, first information that indicates a correspondence relationship between a first address given to a first logical adapter of a plurality of logical adapters included in the physical adapter and a first bus number given to a first bus coupled to the first logical adapter, acquiring, from the first device, second information that indicates a correspondence relationship between a second address given to a second logical adapter of the plurality of logical adapters and a second bus number given to a second bus coupled to the second logical adapter, acquiring, from the second device, third information that indicates a correspondence relationship between the first address and a port number given to the port of the second device, detecting that the second bus number given to the second bus coupled to the second logical adapter is identical to the first bus number given to the first bus coupled to the first logical adapter, and generating fourth information that indicates that the second logical adapter is coupled to the port.

6. The method according to claim 5, wherein the first device performs as a third device and a fourth device, the third device includes a third adapter coupled to the first logical adapter, and the fourth device includes a fourth adapter coupled to the second adapter, the third logical adapter includes a third address, and the fourth adapter includes a fourth address, the method further comprising:
  making the second device to access from the port to the third address and the fourth address, and
generating the fourth information when a response from the fourth adapter is executed.

7. The method according to claim 5, wherein
the first logical adapter is a first logical network adapter using the first physical adapter, and the second logical adapter is a second logical network adapter using the physical adapter.

8. The method according to claim 5, wherein
the fourth information includes data that corresponds an identifier to identify the second device, the port number, the first address and the second address.

* * * * *